4 Sheets--Sheet 1.

E. T. FORD.
Potato-Diggers.

No. 144,083. Patented Oct. 28, 1873.

Fig. I.

WITNESSES:
Jas. E. Hutchinson
John R. Young

INVENTOR.
Elias T. Ford, by
Prindle and Diane, his
Attorneys

E. T. FORD.
Potato-Diggers.

No. 144,083.

4 Sheets--Sheet 2.

Patented Oct. 28, 1873.

WITNESSES:
Jas. E Hutchinson
John R. Young

INVENTOR.
Elias T. Ford, by
Prindle and Drane, his
attorneys.

4 Sheets--Sheet 3.

E. T. FORD.
Potato-Diggers.

No. 144,083. Patented Oct. 28, 1873.

WITNESSES:
Jas. E. Hutchinson
John R. Young

INVENTOR.
Elias T. Ford, by
Prindle and Deane, his
Attorneys.

AM. PHOTO-LITHOGRAPHIC CO. N.Y. (OSBORNE'S PROCESS)

E. T. FORD.
Potato-Diggers.

No. 144,083.

4 Sheets--Sheet 4.

Patented Oct. 28, 1873.

WITNESSES.
Jas. E. Hutchinson
John R. Young

INVENTOR.
Elias T. Ford, by
Prindle and Deane, his
Attorneys

UNITED STATES PATENT OFFICE.

ELIAS T. FORD, OF STILLWATER, NEW YORK.

IMPROVEMENT IN POTATO-DIGGERS.

Specification forming part of Letters Patent No. 144,083, dated October 28, 1873; application filed November 27, 1872.

*To all whom it may concern:*

Be it known that I, ELIAS T. FORD, of Stillwater, Saratoga county, State of New York, have invented certain new and useful Improvements in Potato-Diggers; and do hereby declare that the following is a full, clear, and exact description thereof, reference being had to the accompanying drawings making a part of this specification, in which—

Figure 1:
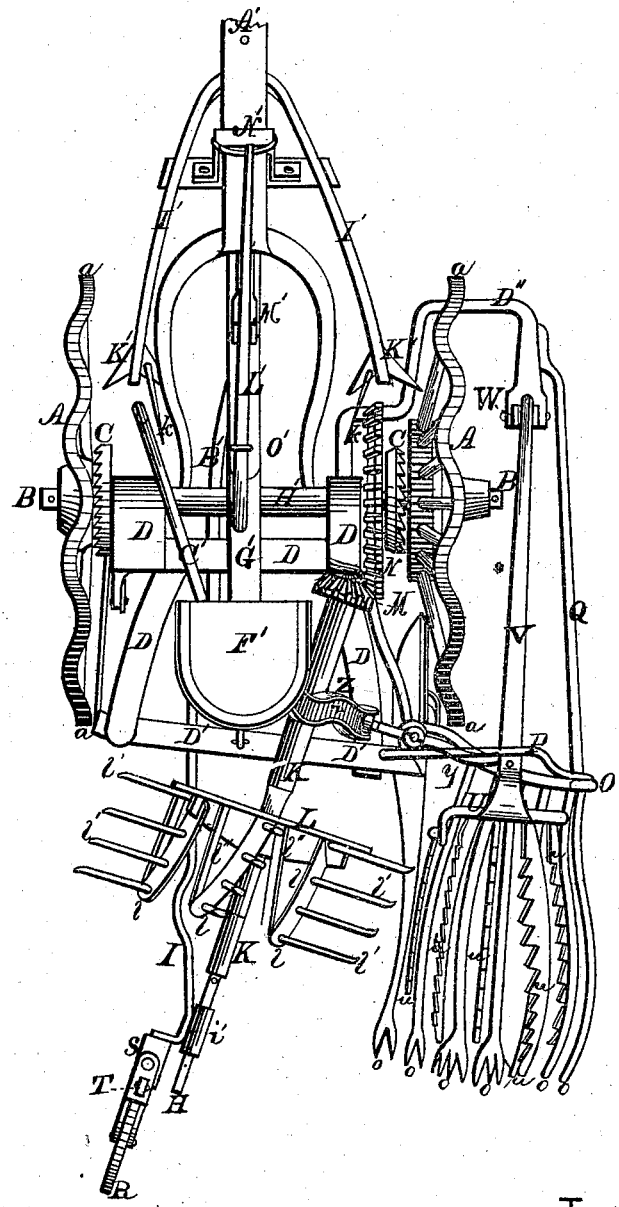
Figure 2:
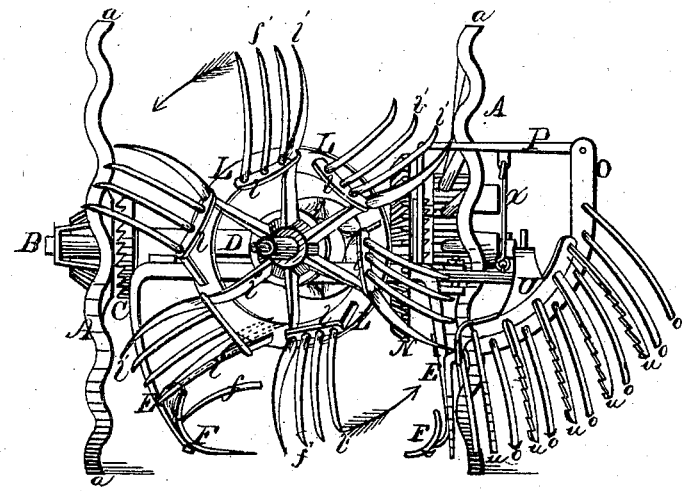
Figure 3:
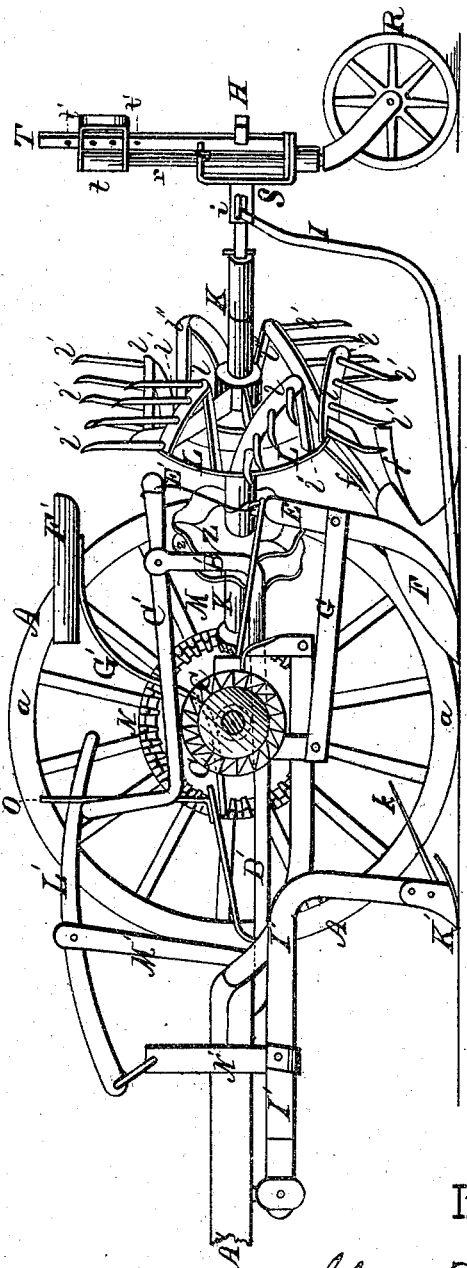
Figure 4:
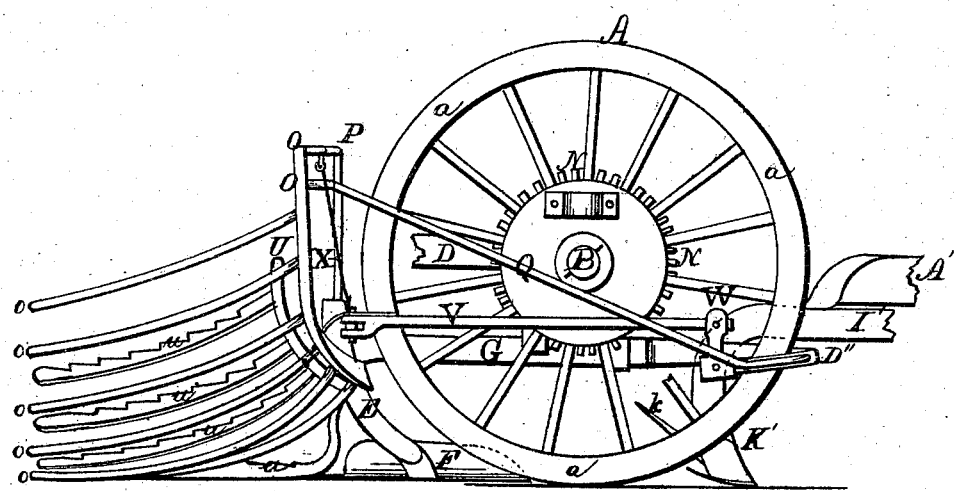
Figure 5:

Figure 1 is a plan view of the upper side of my improved apparatus. Fig. 2 is an elevation of the rear end of the same. Figs. 3 and 4 are elevations of opposite sides of said apparatus, and Fig. 5 is a transverse section of one of the ground or traction wheels.

Letters of like name and kind refer to like parts in each of the figures.

The object of my invention is to render practicable and economical the use of power machinery for the purpose of digging potatoes, separating the same from earth and vines and depositing them upon the surface of the ground in a convenient position for loading; and it consists, principally, in the peculiar construction of the vine-straightener and its attachment upon the lower side of the pole, substantially as and for the purpose hereinafter specified. It consists, further, in a slatted or barred receiver, which inclines rearward and inward in a curve, receives the potatoes and vines from the digger; and is combined with a tined separator that works between the slats or bars of said receiver, and has a horizontally-reciprocating motion in a line with the draft, substantially as and for the purpose hereinafter specified. It consists, further, in combining with one of the loosening-plows suitable curved guide-rods, for turning the earth, vines, and potatoes, to the center and in front of the digger, substantially as and for the purpose hereinafter shown. It consists, further, in a rotary digger, revolving in a vertical plane having an oblique angle to the line of draft, and provided with radial arms, the tines of which, from front to rear, are arranged upon a plane having an angle of about forty-five degrees with relation to said plane of motion, and radially extend outward and slightly rearward in a forward curve, substantially as and for the purpose hereinafter set forth. It consists, further, in the construction, combination, and relative arrangement of the loosening-plows, rotary digger, and reciprocating separator, substantially as and for the purpose hereinafter shown and described. It consists, further, in the means employed for operating the horizontally-reciprocating separator, substantially as and for the purpose hereinafter specified. It consists, further, in the means employed for simultaneously raising the main frame and pole section, and for causing the same to counterbalance each other, substantially as and for the purpose hereinafter shown.

In the annexed drawings, A and A represent two ground or traction wheels, constructed of or from any suitable material, and having their rims or fellies *a* constructed circumferentially upon a wave or serpentine line, as shown in Figs. 1 and 2. Transversely said rim is formed upon radially outward converging lines, so as to give to the same a wedge shape. The wheels described are journaled upon opposite ends of an axle, B, and are each provided with a suitable spring-pawl, which, when said wheel is moved in a forward direction, engages with a toothed disk, C, that is rigidly attached to said axle, but, when said wheel is turned rearward, said pawl passes over the teeth of said disk without engagement, all in the usual manner. Journaled upon the axle B, between the traction-wheels and toothed disks, are the forward ends of the main frame D, which consists of several longitudinal, lateral, and vertical bars, connected together and furnishing a support for the operative mechanism, as is more fully set forth hereinafter. From each end of the rear transverse frame bar D' an arm, E, extends downward and forward in a curve, and has attached to or upon its lower end a plow, F, of usual construction, which plow is set with its moldboard inward, so as to turn its furrow toward the center. A brace, G, is attached to the arm E, near its vertical center, and extending forward and upward is connected to or with the frame D beneath the axle. Secured to or upon the frame D at one side is one end of a shaft or bar, H, which from thence extends rearward and toward the opposite side of said frame at about the angle shown in Fig. 1, and has its rear portion supported by means of a brace-rod, I, which is attached to or upon a band, $i$, that encircles said shaft and from thence extends downward and forward to the lower end of one of the plow-arms E. Upon the shaft H is placed a sleeve, K, to or upon which, immediately in rear of the rear frame-bar D', is secured a wheel-center or disk, L, while at its forward end is attached a bevel-pinion, M, which meshes with and receives motion from a bevel-gear, N, attached to or upon and revolving with the axle B. At equidistant points around the periphery of the wheel-center are secured a number of bars, $l$, which extend in a curve rearward and away from the sleeve K, and are each provided with a number of tines or fingers, $l'$, that extend outward in parallel lines, are somewhat curved toward their outer ends, and have generally an inclination of about five degrees from a radial line. A brace, $l''$, extends between the outer end of each bar $l$ and the periphery of the disk L, and insures the relative position of said parts, the whole forming a rotary digger.

As thus constructed and arranged, it will be seen that a line passing transversely across the face of each set of tines $l'$ would have an angle of about forty-five degrees with the line of draft, and when the digger is caused to revolve in the direction shown by the arrows in Fig. 2, said set of tines or fingered arm will pass the lower center with the rear tines or fingers somewhat in advance of those in front.

The machine is intended to straddle a row of potatoes, and the plows F to pass beneath and raise the sides of said row, after which the arms of the rotary digger, passing transversely through the same, will throw the potatoes, vines, and larger lumps of earth to one side of the machine, where they are received upon a concave inclined support formed of a number of bars or fingers, $o$, that are secured within and extend rearward from a curved head, O, which head is attached at its lower end upon a plow-arm, E, and at its upper end is connected, by means of a brace, P, to or with the rear frame D. A second brace, Q, is attached to the upper end and front side of the head O, and extends forward to and is connected with an arm, D'', which passes from the frame D forward and outward around the traction-wheel.

In order that the operation of the digger may be improved and no liability exist to the clogging or derangement of the same, a number of rods or bars, $f$, are secured upon the moldboard of the plow opposite to the barred support O and $o$, and extend upward, rearward, and inward in a curve, as shown, by which means the larger pieces of soil, together with the vines and potatoes, are turned inward beneath the center of said digger, where they are in the necessary position to be caught by the fingered arms.

The vertical position of the rear end of the frame and of the operating mechanism is insured and a rolling support afforded by a caster-wheel, R, which is attached to or upon the lower end of a shaft or spindle, $r$, that passes upward through suitable bearings S, which bearings are attached to the band $i$ at the rear end of the shaft H, the arrangement being such as to permit said caster-wheel to swivel in the usual manner. The spindle $r$ and caster-wheel R are rendered vertically adjustable with relation to their bearings by means of a block, $t$, which forms a step for the upper end of said spindle and is capable of being moved over a standard, T, that extends vertically upward from the bearings S. A series of holes, $t'$, passing through said standard enable a pin to be passed through the same just above the sliding step, and lock the latter in the position to which it has been adjusted.

In order that the potatoes may be thoroughly freed from soil and vines, a separator, U, having the same general form as the fingered support O and $o$, and having its bars or fingers $u$ provided with rearward-raking teeth, is placed directly over said support, with its said toothed fingers $u$ between the fingers of the latter. To the center of the separator-head U is secured one end of a bar, V, which from thence extends forward, and has its forward end pivoted to or upon the upper end of a bar, W, the lower end of which is, in turn, pivoted to or upon the frame-bar D''. A rod, X, loosely connected at one end to or with the rear end of the bar V, and, at its opposite end, to the brace P, forms a swinging support for said separator, which is thus enabled to move freely, within certain limits, in a line with the draft. Motion in such direction is imparted to the separator by means of a bar, Y, which is pivoted, at one end, to or within the rear end of the bar V; and, at its center, upon the frame-bar D'; and has its inner end contained within a serpentine cam-groove, $z$, that is formed within the periphery of a disk, Z, attached to, and revolving with, the sleeve K.

The operation of the separator is to break up lumps of soil, and cause them to fall through the fingered support, while the potatoes and vines are disconnected from each other, and fall upon the ground at the rear, said vines being upon the upper side, and easily removed when said potatoes are loaded. When the separator moves forward its fingers fall below the fingers of the support, and are forced from engagement with the vines; while, upon the rearward motion, said separator-fingers pass above said supporting-fingers, and, their teeth engaging with said vines, push the latter rearward until they fall upon the ground.

The pole A' is bifurcated rearward from a point about upon a line with the front side of the traction-wheels; and its ends are hinged to or upon the main frame D below and in rear of the axle B. A lever, B', suitably pivoted, near its longitudinal center, immediately below the axle B, and in a line with the draft, has its forward end placed directly beneath the pole A', at its point of bifurcation; while its opposite end extends rearward, and then upward through the frame, and furnishes a bearing for a second lever, C', which latter is pivoted, near its rear end, to or upon said vertical portion, so as to be capable of oscillation in a vertical plane. The rear end of the upper lever, C', is connected to the rear frame-bar D' by means of a rod or chain, E'; while its opposite end extends forward within convenient reach of the driver, who is placed upon a seat, F', that is attached to or upon one end of a spring-standard, G', the lower end of which latter is secured upon a sleeve, H', that loosely encircles the axle B.

As thus arranged it will be seen that, by depressing the front end of the lever C', its rear end will be raised, and with it the main frame and its operating mechanism; while the downward pressure thrown upon the fulcrum B' of said lever will cause the same to be depressed and its front end raised, so as to correspondingly raise the rear end of the pole.

By properly adjusting the lengths and points of suspension of the levers B' and C' the mechanism in front and in rear of the axle can be caused to counterbalance each other, so as to entirely relieve the necks of the horses from the usual downward pressure of the pole and the mechanism supported by or attached to the same.

In order that the vines may be removed from the spaces between the rows of potatoes, and brought into a line with the row that is being operated upon, I pivot, upon the lower side of the pole A', the united ends of two plow-beams, I', which from thence extend rearward and apart to a point just in rear of the front side of the wheels A, and from thence extend downward, and are each provided with a shovel-plow, K', that has the general shape of a cultivator-plow. From the inner rear side of each plow K' a bar, k, extends rearward, upward, and inward, as shown in Figs. 1 and 3, and serves as a guide for turning inward the vines which have been raised by said plow.

The distance between the plows K' and K' is such as to cause them to impinge upon the outer lines of the row of potatoes, and loosen the soil at such points, while all vines which extend outward beyond such lines are raised and turned inward in such positions as to cause them to pass between the loosening-plows without catching upon and obstructing other portions of the machine.

The vine-straightener is raised from contact with the ground by means of a lever, L', which is pivoted near its longitudinal center to or within a standard, M', that extends upward from the pole section, and has its forward end connected with a yoke, N', which spans the pole A', and is attached to the plow-beams I'. By depressing the rear end of the lever L', which is within convenient reach of the operator's hand, its front end, the yoke, and plow-beams will be raised. A suitable spring-catch, O', engaging with the rear end of the lever L' when depressed, enables the same to be locked in position.

The general operation of the machine is as follows: Being placed astride of a row of potato-hills, the vine-straightener and digging devices are lowered, and the machine drawn forward. The vine-straightener gathers inward the straggling vines, and partially loosens up the sides of each hill. The plows in rear still further loosen the soil, and the rotary digger throws the potatoes, vines, and large lumps of earth upon the barred receiver, where the potatoes are thoroughly separated from said soil and vines, and at the rear fall upon the surface of the ground.

The principal advantages obtained by the construction described are as follows: First, by the combined operation of the loosening-plows, rotary digger, and reciprocating separator, the potatoes are easily and thoroughly freed from the soil and vines, and deposited upon the surface of the ground, regardless of the character or condition of the soil. Second, by connecting the pole section to the main frame below and in rear of the axle, the draft of the horses assists to hold the loosening-plows and digger down to their work. Third, by combining the pole section, main frame, and elevating-levers, so as to cause the operating mechanism to be balanced upon the axle, the horses are relieved from much hard work and annoyance that would otherwise be occasioned by the weight upon their necks of the pole section when the machine was being driven to or from the field. Fourth, the serpentine form of the rims of the traction-wheels largely increases their hold upon or within the ground, while the wedge shape radially of said rims prevents the soil from adhering, even when wet and heavy.

Having thus fully set forth the nature and merits of my invention, what I claim as new is—

1. The vine-straightener, consisting of the combined diverging beams I', pivoted to or upon the pole A', and provided upon their rear lower ends with the shovels K' and guide-bars k, all combined and arranged substantially as and for the purpose specified.

2. The slatted or barred receiver O and o, constructed as shown, and combined with the tined separator U and u, which has a reciprocating motion in a line with the draft, substantially as and for the purpose specified.

3. In combination with the rotary digger, the loosening-plow F, provided with the guide bars or rods f, which are secured to and extend rearward, upward, and inward from the same, substantially as and for the purpose shown.

4. A rotary digger, revolving in a vertical plane, having an oblique angle to the line of draft, and provided with radial arms, the tines of which from front to rear are arranged upon a plane having an angle of about forty-five degrees with relation to said plane of motion, and which radially extend outward and slightly rearward in a forward curve, substantially as and for the purpose set forth.

5. The construction, combination, and relative arrangement of the loosening-plows, rotary digger, and reciprocating separator, substantially as and for the purpose shown and described.

6. The means employed for suspending the separator U and $u$, and imparting thereto a horizontally-reciprocating motion, consisting of the pivoted bars V and W, the rod X, the pivoted lever Y, and the cam-grooved disk Z and $z$, all constructed and combined to operate substantially as and for the purpose specified.

7. In combination with the main frame and pole section, the levers B' and C', pivoted together, and connected with said parts, in the manner and for the purpose substantially as shown.

In testimony whereof I have hereunto set my hand this 25th day of September, 1872.

ELIAS T. FORD.

In presence of—
    L. VANDEMARK,
    D. GILMAN.